United States Patent [19]

Godfrey et al.

[11] 3,918,595

[45] Nov. 11, 1975

[54] BALE HANDLING MACHINE

[76] Inventors: Vern L. Godfrey; Bill D. Clark, both of Rte. 4, Warrensburg, Mo. 64093

[22] Filed: June 14, 1974

[21] Appl. No.: 479,408

Related U.S. Application Data

[62] Division of Ser. No. 274,337, July 24, 1972, Pat. No. 3,826,389.

[52] U.S. Cl. ............................ 214/6 B; 214/510
[51] Int. Cl.² ............... B65G 57/28; B65G 57/32
[58] Field of Search ........ 214/1 QA, 6 B, 6 BA, 6 C, 214/501, 510, 310

[56] References Cited
UNITED STATES PATENTS

| | | | |
|---|---|---|---|
| 2,822,659 | 2/1958 | Moore | 214/6 B X |
| 2,924,051 | 2/1960 | More | 214/6 BA X |
| 3,412,882 | 11/1968 | Stockwell | 214/501 |
| 3,435,972 | 4/1969 | Miskin et al. | 214/501 |
| 3,499,550 | 3/1970 | Jensen | 214/6 B |
| 3,549,023 | 12/1970 | Backman | 214/6 B |
| 3,618,791 | 11/1971 | Potter et al. | 214/6 BA |
| 3,627,149 | 12/1971 | Arnemann | 214/6 BA |

*Primary Examiner*—Robert J. Spar
*Assistant Examiner*—Leslie J. Paperner
*Attorney, Agent, or Firm*—Schmidt, Johnson, Hovey & Williams

[57] ABSTRACT

A mobile bale handling machine picks up successive bales in the field and directs the same rearwardly into a receiver in which a stacked load of the bales is formed from the bottom up by virtue of a pusher in the receiver which raises successively formed tiers of the bales to holding structure located above the tier-forming level of the receiver. Upon completing the formation of the stacked load, the receiver may be tilted about a horizontal axis to swing the tiers of the load into an upright disposition, whereupon the same pusher used to build the load may be employed to displace the load of bales through the open top of the receiver as a stack. Upstanding load-retaining forks of the receiver may be inclined as the receiver is tilted in order to give the receiver a canted appearance for overhead clearance. The stack may subsequently be retrieved by virtue of the ability of the retaining forks to operate independently of one another for maneuvering under and over the stack and for clamping the same within the receiver for subsequent tilting to a transport position.

13 Claims, 20 Drawing Figures

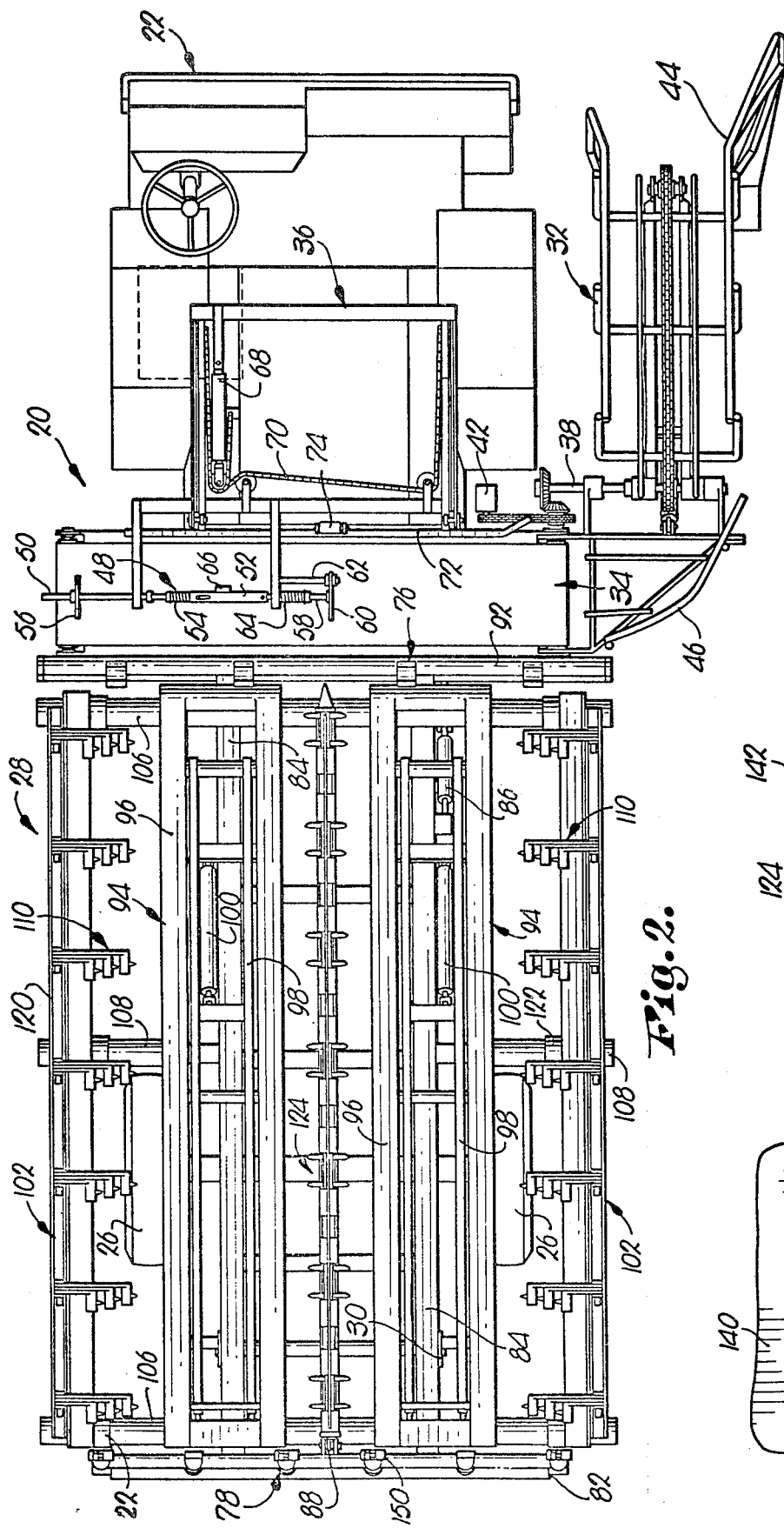
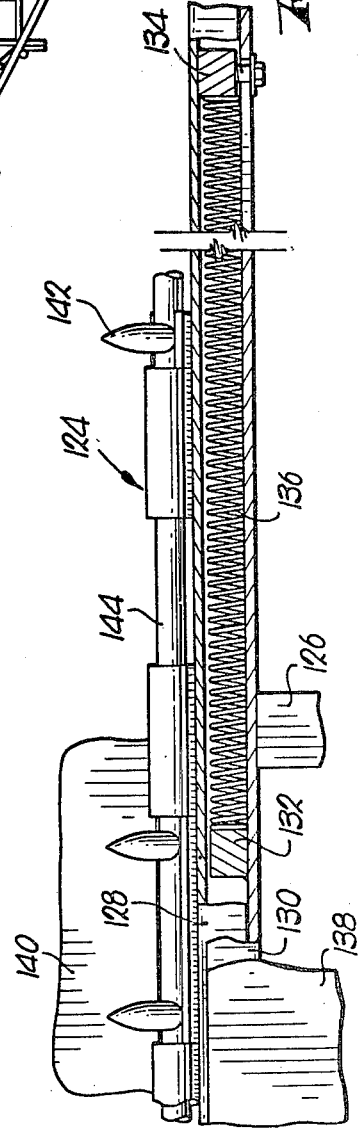
Fig. 2.
Fig. 10.

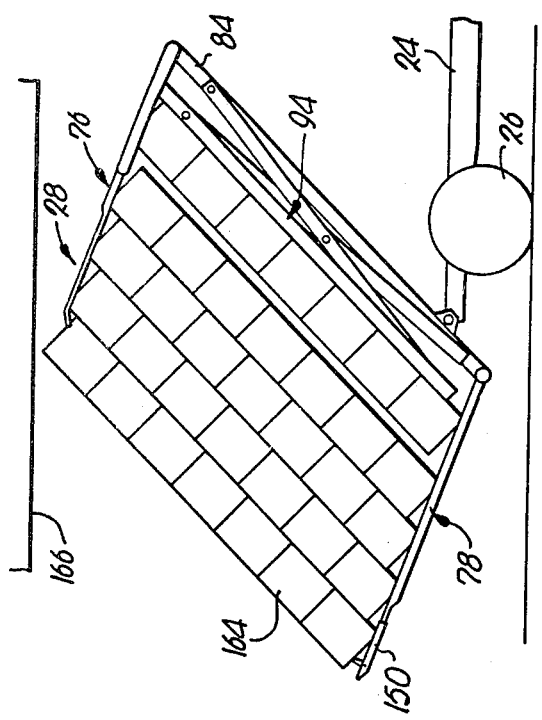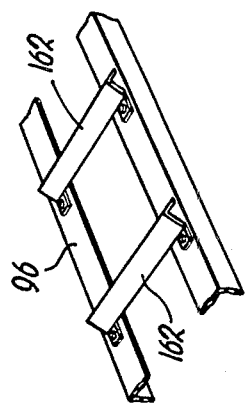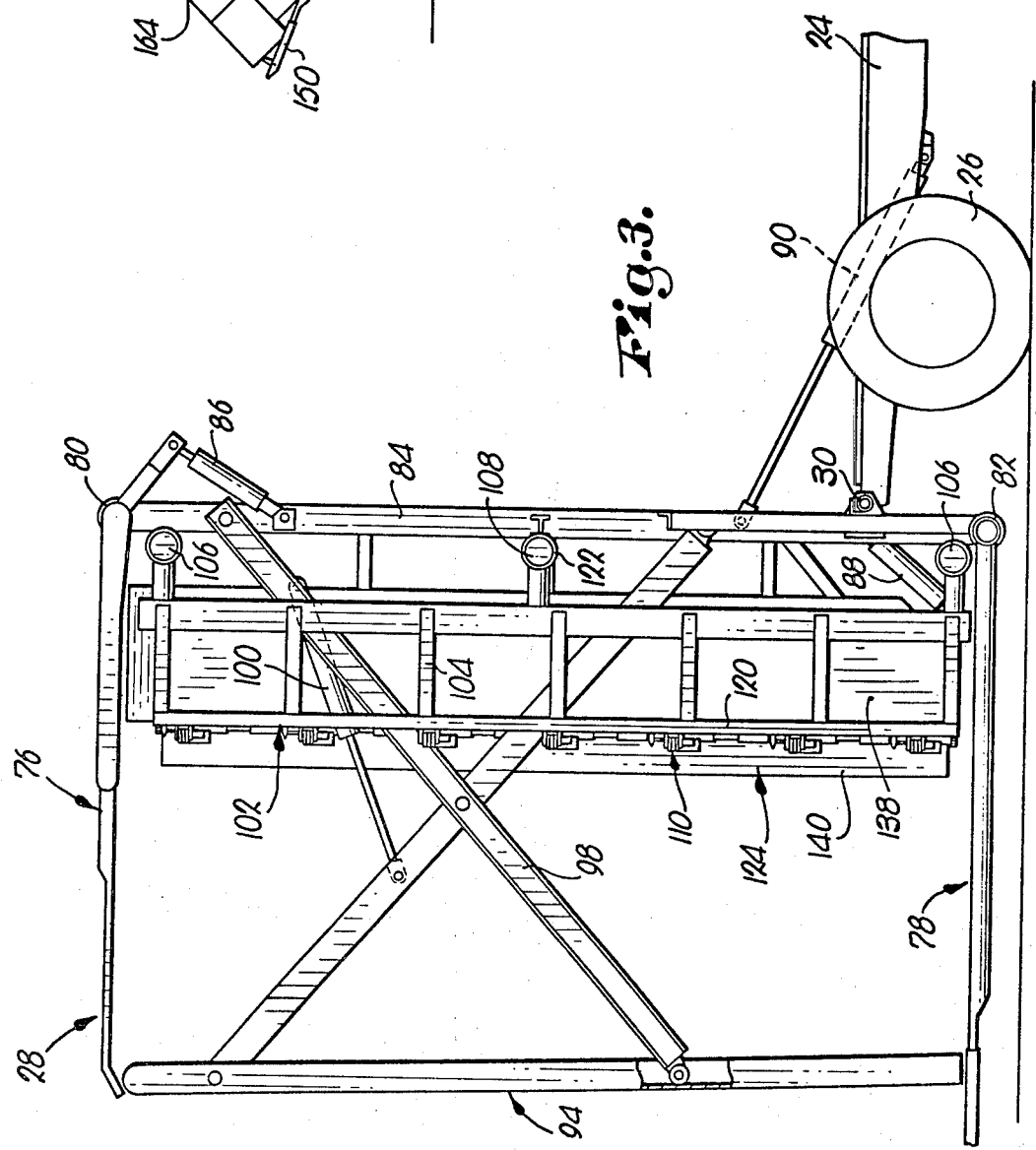

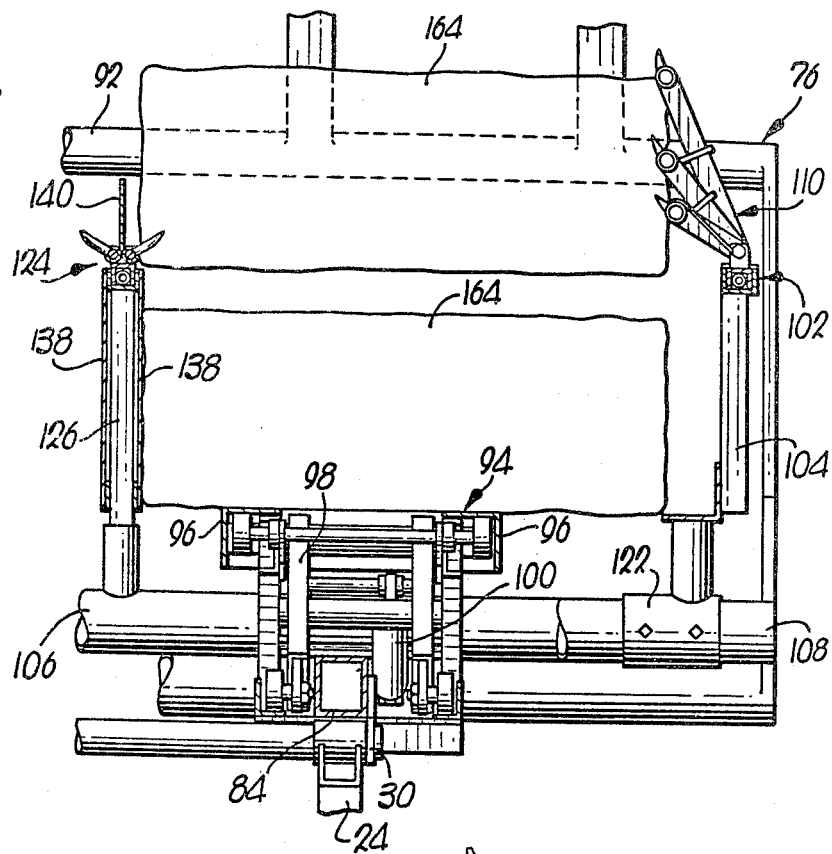
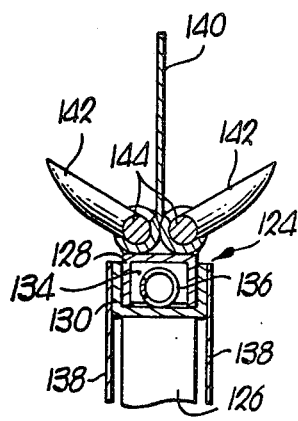
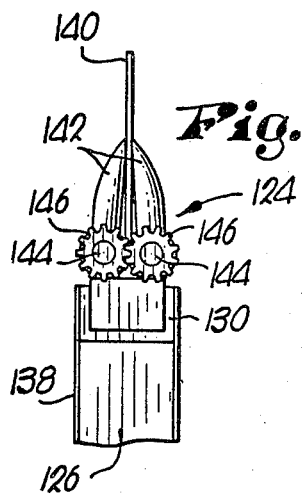
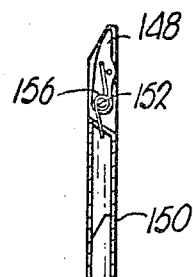
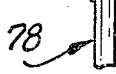
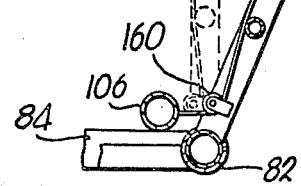

BALE HANDLING MACHINE

This is a division of application Ser. No. 274,337, filed July 24, 1972, now U.S. Pat. No. 3,826,389.

This invention relates to apparatus for article handling and more particularly, to a machine having special utility for hay bale handling operations in which it is necessary to pick up the bales from the field on an individual basis, build a stack from the bales, and then unload the stack so formed at a selected location.

Bale stacking and unloading machines are not new per se because various types of such machines have been built and used with various degrees of success in recent years in an effort to provide the industry with means for solving the problems associated with the handling and storage of baled crops. On the one hand, from a time, labor, and cost standpoint, it is of course desirable to produce a large stack of the bales but, on the other hand, it must be recognized that handling problems are increased as stack size increases in view of the tendency of the bales to shift relative to one another during any displacement of the resulting stack, such as during unloading of the stack or retrieval thereof. Accordingly, in order to arrive at an optimization of all factors involved in bale handling, many machines have resorted to intricate and elaborate arrangements for building and subsequently unloading the stack such as, for example, a series of tiltable beds and cooperating pushers for building the stack by upending and displacing successive rows of bales until a stack thereof is finally produced. Others have employed basically a single receiver for the articles with which a number of pushers or transfer devices are associated for loading bales into the receiver, forming a stack from the loaded bales, and then subsequently employing a third member or apparatus for displacing the stack from the receiver after the same has been tilted to an unloading position.

The prior handling machines have thus suffered from an overabundance of complicated mechanical devices and apparatus for building the stack and unloading the same after its complete formation. Moreover, in those machines which tilt the completely formed stack about a horizontal axis for subsequent unloading, no provision has heretofore been made for accomplishing such unloading (and corresponding retrieval) within protective structures which may have low overhead clearance. Thus, prior machines of the tilting receiver type have been severely restricted in the size of the stack which they can produce and unload, in view of the fact that the effective height of the load increases as it is tilted to an upended position.

Accordingly, in view of these and other shortcomings of prior article handling machines, it is one important object of the present invention to provide a machine for handling stackable articles such as crop bales which employs the same pusher or transfer machanism for both building a stack within a receiver of the machine and unloading and completed stack from the machine, thereby avoiding the problems inherit in prior complex handling machines which utilize a multitude of such transfer mechanisms.

Another important object of the instant invention is to provide an article handling machine such as for crop bales which is of the tilting receiver type in which the receiver with its full load of articles stacked therewithin may be canted during tilting in order to reduce the effective height of the receiver and its load to clear low overhead structures.

An additional important object of this invention is to provide a handling machine as aforesaid having a tiltable and cantable receiver in which upstanding retaining forks of the receiver defining its confines may be inclined independently of one another in order to provide both the canted configuration of the receiver and a clamping action against the stack during tilting thereof in order to control the articles of the stack.

A further important object of the instant invention is to provide a handling machine as aforesaid in which stack retrieval may be carried out as smoothly and efficiently as stack building and unloading.

Yet another important object of this invention is to provide a stacking and unloading machine in which the stack-building process is greatly simplified by virtue of pusher mechanism within the stack receiver of the machine which builds a stack from the bottom up by raising successively formed, complete tiers of articles to holding structure located above the tier-forming level of the receiver.

In the drawings:

FIG. 2 is a top plan view of the machine;

FIG. 3 is a fragmentary, side elevational view of the machine showing the receiver thereof in its fully tilted, unloading position with the stack pusher fully extended;

FIG. 4 is a fragmentary, enlarged cross sectional view of the machine taken along line 4—4 of FIG. 1;

FIG. 5 is an enlarged, essentially vertical cross sectional view of the rear retaining fork of the stack receiver illustrating the fork in its normal and inclined conditions;

FIG. 6 is an enlarged, fragmentary, elevational view of the tip end of one of the rear retaining forks;

FIG. 7 is an enlarged, fragmentary cross sectional view of the tip end taken along line 7—7 of FIG. 6;

FIG. 8 is an enlarged, fragmentary elevation view of the central holding structure for the bales of the stack, the spikes of such structure being illustrated in their fully closed position;

FIG. 9 is a cross sectional view of the structure of FIG. 8 with the spikes in their fully open position;

FIG. 10 is an enlarged, fragmentary side elevational view of the central holding structure with parts broken away and shown in cross section to reveal the longitudinally shiftable nature of the support for the spikes of the structure;

FIG. 11 is an enlarged, fragmentary side elevational view of the outer holding structure for the bales of the stack, parts being broken away and shown in cross section for clarity;

FIG. 12 is a schematic view of the machine illustrating the fully loaded receiver thereof in a partially tilted and canted condition;

FIG. 13 is a fragmentary, perspective view of the upper members of the pusher mechanism, showing the addition of special cross elements for handling cylindrical hay rolls as opposed to rectangular bales.

Figure 1:
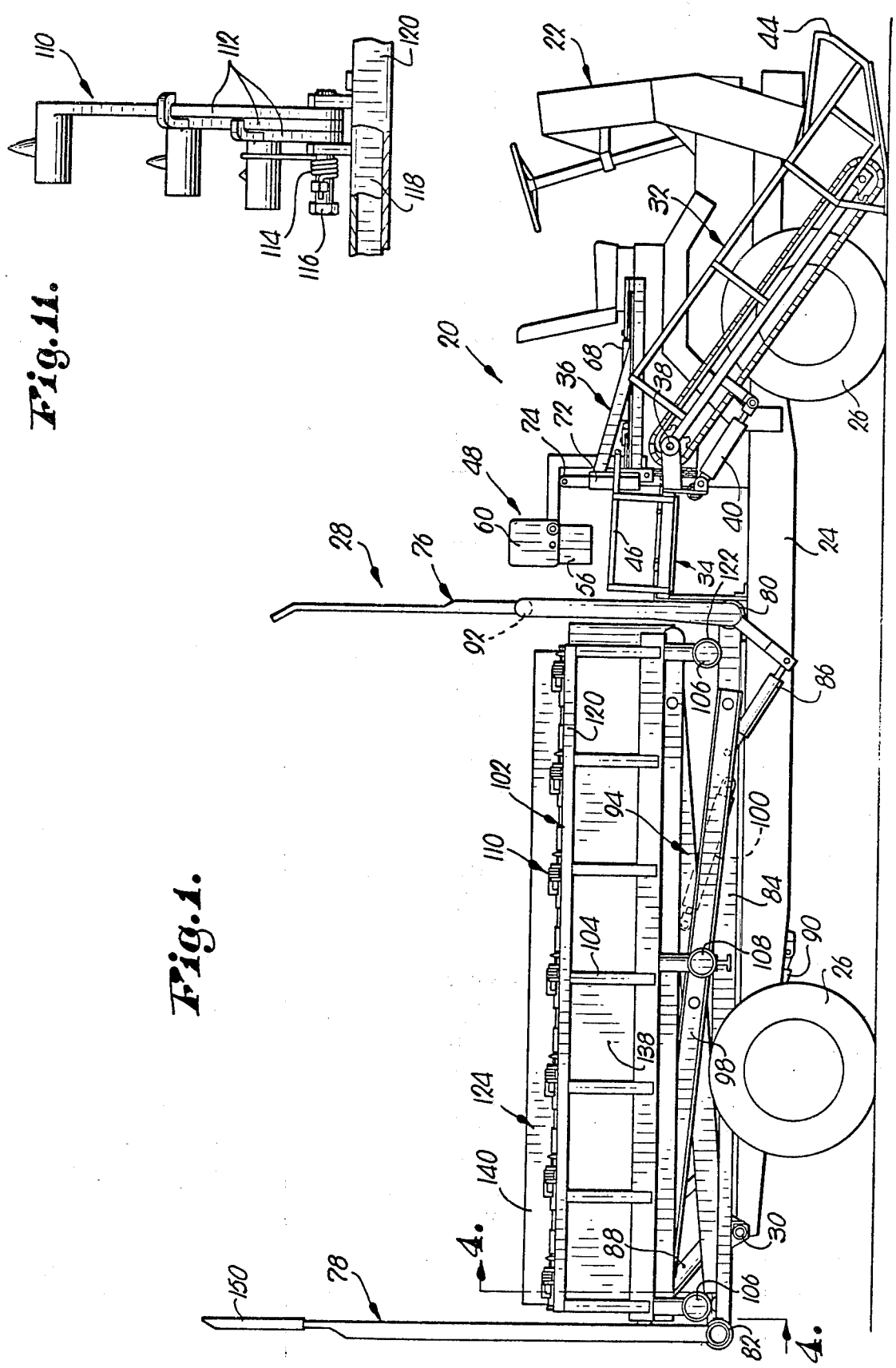
FIG. 1 is a side elevational view of a handling machine embodying the principles of the present invention.

With initial reference to FIGS. 1–4, the machine 20 is mobilized by virtue of a vehicle 22 having a fore-and-aft extending chassis 24 and ground engaging wheels 26. A receiver, broadly denoted by the numeral 28 is tiltably mounted on the rear of chassis 24 by virtue of a pivot assembly 30, and means for supplying receiver 28 with articles such as crop bales are located adjacent the forward end of chassis 24, including a pick up elevator 32, a transversely extending conveyor 34, and a fore-and-aft operating loader 36.

The pickup elevator 32 is adapted for raising and lowering about an axis 38 by virtue of a hydraulic piston and cylinder assembly 40 and is driven by a hydraulic motor 42 coupled with elevator 32 through a gear and belt drive system. The mouth 44 of pickup 32 is open for the entry of bales thereinto and a generally arcuate elbow guide 46 at the rear end of elevator 32 directs bales picked up by elevator 32 onto the transversely operating conveyor 34.

The conveyor 34 is adapted to receive bales from elevator 32 in end-to-end relationship and is of sufficient length to accommodate a pair of standard sized bales. Overhanging the conveyor 34 is control apparatus 48 for maintaining the essentially end-to-end bales in a separated condition, the purpose of such separation hereinafter becoming apparent. Apparatus 48 includes a shaft 50 which is shiftable axially within a sleeve 52 by virtue of a slot and pin arrangement against the action of a spring 54. Shaft 50 has a depending plate 56 rigidly affixed thereto, and the opposite end of apparatus 48 has a shaft 58 which is not shiftable relative to sleeve 52 but which is insertable within and removable from an opening in a second plate 60 swingably supported on a shaft 62; plate 60 may thus be retained in a standby raised position, indicated in FIG. 1, by the shaft 58, or may be released for swinging about shaft 62 into a lowered position.

Plate 60 is also slidable axially along shaft 62 as well as being rotatable thereabout, and a second spring 64 yieldably biases an assembly comprised of the sleeve 52 and the shafts 50 and 58 in a direction to retain plate 60 in its raised position. Thus, when a first bale is moved by conveyor 34 into engagement with the plate 56, the entire assembly 50, 52 and 58 is pulled by the bale against the action of spring 64 to withdraw shaft 58 from plate 60, thereby allowing the latter to swing downwardly about its mounting shaft 62. Therefore, when the second bale is moved by conveyor 34 from elevator 32 toward the opposite side of vehicle 22, the suspended plate 60 blocks its further advancement, thus maintaining the two bales in separation. However, by virtue of the pin and slot coupling between shaft 50 and sleeve 52, the plate 60 (which has not completely cleared shaft 58 although in its suspended position) may be pushed along its mounting shaft 62 by the second bale to shift shaft 58 and sleeve 52 axially against spring 54 to operate a switch 66 which controls the loader 36.

Loader 36 is shiftable in a fore-and-aft direction across conveyor 34 by virtue of a piston and cylinder assembly 68 and cooperating chain and sprocket mechanism 70. A horizontally extending bumper 72 on loader 36 is positioned to shove the two end-to-end bales from conveyor 34 into receiver 28 upon actuation of loader 36, and an upstanding roller 74 engages the suspended plate 60 and swings the latter back up to its retaining position as loader 36 operates.

The receiver 28 is defined at its front and rear ends by upstanding retaining forks 76 and 78 respectively which are each independently tiltable about spaced horizontal axes by virtue of their rotatable connections at 80 and 82 to a pair of fore-and-aft extending support beams 84. The beams 84 are, of course, connected to the chassis 24 at the pivotal coupling 30 to render receiver 28 tiltable, and a pair of individually operable piston and cylinder assemblies 86 and 88 interconnect one of the beams 84 with the front fork 76 and the rear fork 78 respectively to power forks 76 and 78 for inclination thereof. An additional main hydraulic piston and cylinder assembly 90 interconnects chassis 24 and beams 84 for effecting the tilting of receiver 28.

Each of the forks 76 and 78 is in essence a framework of members which extends the full width of receiver 28, and the front fork 76 has a horizontally extending cross member 92 below which is defined a receiving window (as shown best in FIG. 4) to allow entry into receiver 28 of the bales pushed from conveyor 34 by loader 36. Although not shown in detail, it is understood that the pivotal connections 80 and 82 for forks 76 and 78 respectively may be of various types and configurations, one of such arrangements taking the form of outer sleeve pipes mounted on beams 84 which rotatably receive inner pipes affixed to each of the respective forks 76 and 78.

The floor or bed of receiver 28 is defined by a pair of laterally spaced apart pushing mechanisms 94, each of which comprises a rectangular, open upper platform 96 operated by a scissors linkage 98 which employs a hydraulic piston and cylinder assembly 100 interconnecting the linkage 98 and a corresponding beam 84. Thus, the open platforms of pusher mechanism 94 are reciprocable toward and away from the open top of receiver 28 defined by the uppermost ends of the forks 76 and 78.

The lateral sides of receiver 28 are open for the most part, but are defined for a short distance above beams 84 by identical, fore-and-aft extending holding structures 102 for bales which are elevated by pusher mechanisms 94. Each of the structures 102 includes an upstanding framework 104 which is supported by a pair of front and rear cross pipes 106 and by a pair of opposed, short cross pipes 108 which extend inwardly from opposite sides of receiver 28, all of such pipes 106 and 108 being directly and indirectly supported by beams 84. Each structure 102 also includes a series of triple spike assemblies 110 (FIG. 11) comprising three individual spikes 112 limited to swinging in unison with one another. A torsion spring 114 for each assembly 110 yieldably biases the spikes 112 downwardly about their pivot bolt 116, and the outermost ends of each of the spikes 112 is upturned slightly as shown best in FIG. 4.

Each row of assemblies 110 may be shifted front to rear for a purpose which will hereinafter be made clear by virtue of relatively slideable, inner and outer mounting channels 118 and 120 respectively, and a spring may be provided, although not shown, interconnecting channels 118 and 120 to bias the inner, movable channel 18 into its normal, non-shifted position relative to outer channel 120. Outwardly adjustable mounting sleeves 122 (FIG. 4) on the cross pipes 106 for each structure 102 permit the effective width of receiver 28 to be varied as required.

The receiver 28 is also provided with a central holding structure 124 for cooperating with the outer holding structures 102 in supporting a tier of bales above the tier forming level of receiver 28 as will hereinafter be described in detail. The central structure 124 is detailed in FIGS. 8, 9 and 10 and includes a plurality of upright standards 126 spaced longitudinally in a fore-and-aft direction which support along the tops thereof a pair of horizontal, fore-and-aft extending inner and outer mounting channels 128 and 130 respectively, which are virtually identical to mounting channels 118 and 120 for side structures 102. Channels 128 and 130 are thus longitudinally shiftable, and a pair of blocks 132 and 134 in the outer and inner channels 130 and 138 respectively confine a spring 136 for yieldably biassing inner channel 128 to its normal, unshifted position as shown in FIG. 10.

A pair of dividing panels 138 are disposed on opposite sides of the standards 126 for sliding abutment with bales within receiver 128, and a single dividing panel 140 projects upwardly in upstanding relationship to the inner channel 128 for assisting in dividing the elevated bales from one another.

The central structure 124 also includes two sets of inner spikes 142 mounted on side-by-side fore-and-aft extending shafts 144. The shafts 144 are operably interconnected by a pair of intermeshing cogs 146 (FIG. 8) which operate the spikes 142 simultaneously and allow the same to swing between the two extreme positions illustrated by FIGS. 8 and 9. It is to be noted that the spikes 142 in their open position of FIG. 9 project outwardly and upwardly in much the same manner as the corresponding spike ends of spikes 112 on the outer structures 102, each corresponding set of inner and outer spikes 142 and 112 thus normally projecting into the section of receiver 28 defined by the corresponding dividing panel 138 and side framework 104.

As shown in FIGS. 5–7, the rear fork 78 has certain of its uprights provided with a retractable tine 148 at the tip 150 of such certain uprights. Each retractable tine 148 is swingable about a pivot 152 into and out of a notch 154 in tip 150 and is biased into notch 154 by a torsion spring 156 on pivot 152. A cable 158 interconnects each tine 148 with the rear cross pipe 106 after entrainment below an idler pulley 160 such that the cable 158 is operative to activate tine 148 when rear fork 78 is inclined as shown in FIG. 5.

As shown in FIG. 13, each of the open platforms 96 of each pusher mechanism 94 may be provided with longitudinally spaced apart angle members 162 which are inverted and placed in bridging relationship to the opposed sides of platform 96 to receive a cylindrical article such as a rolled crop bale. In this manner, the machine 20 of the present invention may be adapted easily for either rectangular articles in which case the angles 162 will not be used, or cylindrical articles in which case such angles 162 will be provided.

OPERATION

Figure 14:
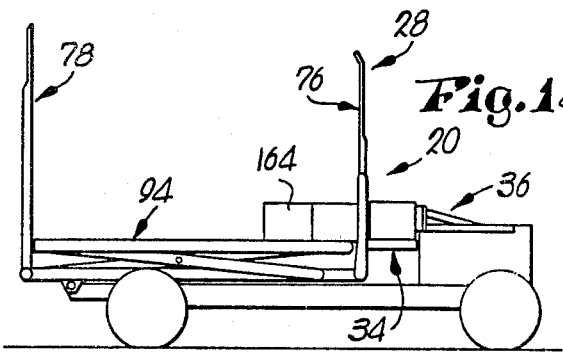
FIGS. 14–20 are schematic views of the machine illustrating the same in various stages of stack building and unloading.
Figure 15:
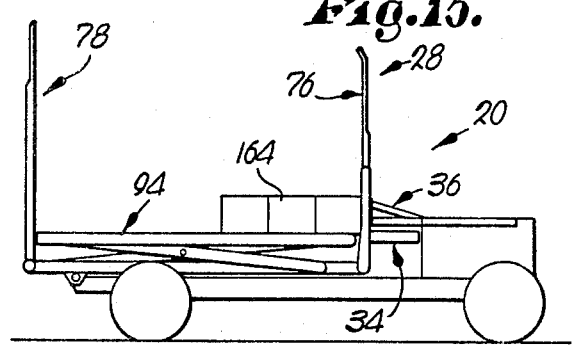

The handling machine 20 is designed for one-man operation by virtue of the placement of all operating controls within easy reach of the driver of the vehicle 22. As the machine 20 is thus advanced through a field, the pick up elevator 32 is utilized in the manner earlier described to elevate the bales successively in endwise relationship to one another onto conveyor 34 for subsequent rearward displacement by loader 36 into receiver 28. Initially, of course, the receiver 28 is disposed in its horizontal, loading position illustrated schematically in FIG. 14, and the pusher mechanisms 94 are both at their lowermost positions for receiving two spaced apart, fore-and-aft extending rows of bales 164. Because of the separation of the two bales when initially presented to conveyor 34, the two separate rows of bales 164 on opposite sides of central holding structure 124 are formed as pairs of end-to-end bales are successively pushed by loader 36 through front fork 76 onto the pushers 94.

Figure 16:
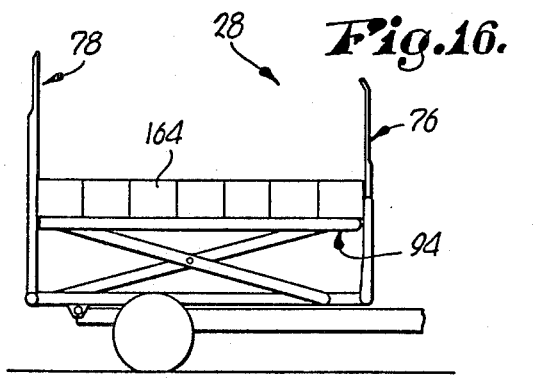

This operation continues until a complete first tier containing, for example, fourteen bales is formed on the pusher mechanisms 94. As the last pair of bales is pushed into position on pushers 94, the first pair of bales actuates a conventional control (not shown) on rear fork 78 which in turn actuates mechanisms 94 to raise the completed first tier upwardly to the level illustrated in FIG. 16 and in FIG. 4 for holding of such tier by the inner and outer spike structures 124 and 102. In this respect, it is to be noted that the spike assemblies 110 on the outer structures 102 as well as the spikes 142 on the central structure 124 allow movement of its corresponding row of bales in that section of receiver 28 only in an upward direction as the corresponding pusher mechanism 94 elevates that row of bales in the tier. Thus, the first tier of bales is firmly impaled by the upturned spikes 112 and 142 to prevent retrograde, downward movement of such tier after the pusher mechanisms 94 are retracted down to their initial lower positions within receiver 28. Moverover, it is to be appreciated that the torsion springs 114 on the spike assemblies 110 operate to shift the bales firmly against the inner spikes 142 as shown in FIG. 4.

Figure 17:
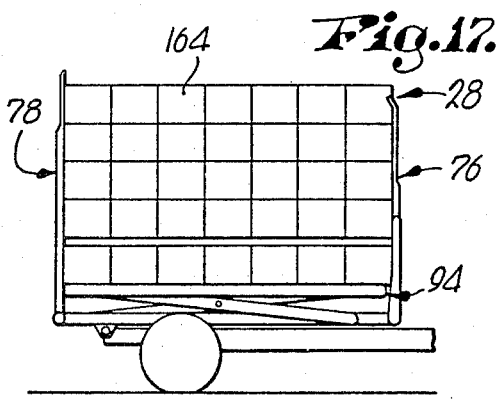

After the first tier of bales 164 has been formed, elevated to its holding level above the formation level within receiver 28, and the pushers 94 subsequently retracted to their lower positions, the receiver 28 is again in condition for receiving the next bales utilized to form a second tier. Thus, the tier forming and elevating steps are repeated until a load, formed from the bottom up, containing several tiers is produced and supported above the tier forming level of receiver 28. When the receiver 28 has been filled to capacity and the final tier has been formed therein on pusher mechanisms 94, the condition illustrated in FIG. 17 is presented. Thus, the final tier of bales is not raised by pusher mechanisms 94. but only rests thereon spaced slightly below the next proceeding tier as shown.

Figure 18:
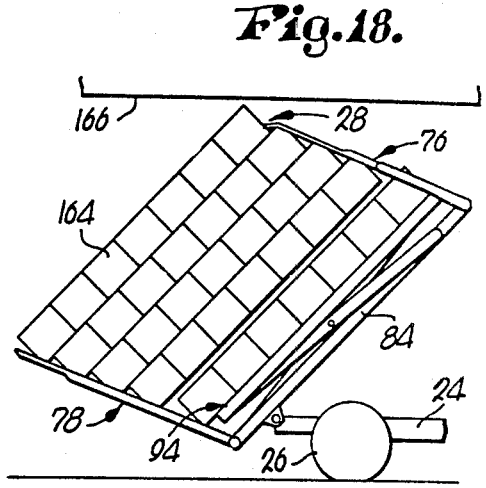

The pick up elevator 32 may then be raised to its transport position by actuating assembly 40 and the load thus formed within receiver 28 transported to an unloading site, such as within a barn. In the event that the barn has a low overhead structure such as 166 in FIGS. 18 and 19, the cantability of receiver 28 becomes especially valuable. After actuating piston and cylinder 90 to tilt receiver 28 approximately to the position shown in FIG. 18, it may become apparent that the structure 166 will not allow further tilting without compensation in some manner for the low overhead clearance. Accordingly, as the position of FIG. 18 is approached, the piston and cylinder assemblies 86 and 88 may be actuated to the extent necessary to incline front and rear forks 76 and 78 in order to produce the canted appearance and condition of receiver 28 shown in FIGS. 12 and 18. Such inclination of forks 76 and 78 and canting of receiver 28 thereby induces shifting of the bale tiers relative to one another and reduces the effective height of receiver 28 and the bale load.

Figure 19:
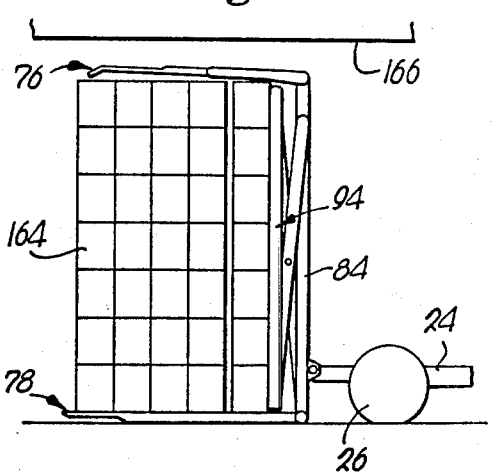

Thus, such effective height may be lessened to a degree necessary to assure clearance of overhead structure 166, whereupon tilting of receiver 28 may be continued by again activating tilt cylinder 90 to swing receiver 28 to essentially upright condition of FIG. 19.

As the bale tiers are thus brought into an upright condition as shown in FIG. 19 along with receiver 28, the forks 76 and 78 may be returned to their normal uninclined condition to reestablish the rectangular configuration of the bale load.

Figure 20:
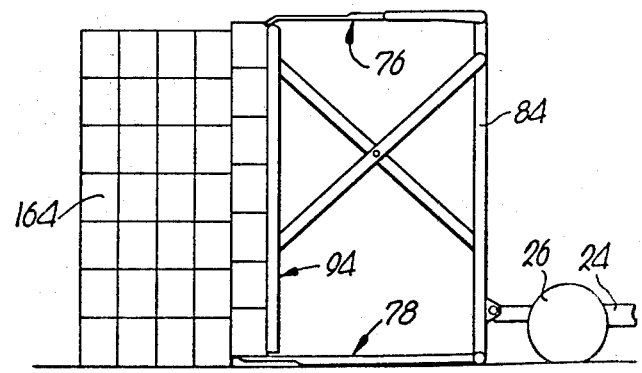

The automatic operating controls for the pusher mechanisms 94 may then be disarmed and an auxiliary control system actuated to extend the pusher mechanisms 94 to their fullest extent as shown in FIG. 20, thereby effectively displacing the bales from receiver 28 as a stack. In this connection, it may be desirable to allow vehicle 22 to move forwardly as pusher mechanism 94 displace the stacked bales in order to avoid movement of the upright tiers once the same have been disposed on the ground or other supporting surface. After the final now upright tier has been displaced from receiver 28, the pusher mechanisms 94 may be withdrawn to their innermost positions, and the receiver 28 again retilted to its ready position for picking up and forming the next load of bales.

It is to be noted that the tines 148 on rear fork 78 are projected as shown in FIG. 12 during inclination of fork 78. Thus, the uppermost tier is effectively preclude from slipping from receiver 20 as the latter is tilted to its unloading position. Moreover, it is important to note that because of the individual operability of the front and rear forks 76 and 78, the same may be used to effectively clamp the bales therebetween as receiver 28 is tilted, thereby providing positive control over the bales during such operation.

It is also important to point out that relative shifting between the bale tiers is effected in a controlled manner not only through operation of the forks 76 and 78, but also by virtue of the shiftable holding structures 102 and 124. Thus, even though the lowermost of the tiers supported above the formation level of receiver 28 is shifted in response to tilting of receiver 28, such shifting is controlled because the respective tines of structures 102 and 124 move therewith, still impaling the bales of such tier. Retrieval of the stack or stacks previously deposited by receiver 28 may be easily effected by virtue of the independent operability of forks 76 and 78. After backing up to the stack, the forks 76 and 78 may be spread apart by their respective piston and cylinder assemblies 86 and 88 in order to effectively maneuver fork 78 beneath the stack and fork 76 over the top of the stack. Subsequently, forks 76 and 78 may be shifted toward one another to clamp the stack therebetween, and the receiver 28 then swung upwardly to its normal position overlying chassis 24 for transport of the stack. Once again, the cantability of receiver 28 is extremely important, since receiver 28 and its load may be canted to the extent necessary in order to clear overhead structure 66 during return swinging.

Also of great significance is the fact that machine 20 is ideally suited for stacking and handling cylindrical rolls of crop material as well as rectangular bales. This is due not only to the provision of optional angle members 162, but also to the formation of one complete tier at a time before any of the rolls of such tier are raised by pushers 94. Thus, the tier formed by the rolls supports those in the next higher tier without fear that higher rolls will roll off those below. Previous machines that formed upstanding, single rows of bales before pushing such rows rearwardly could not effectively handle rolls, since they would not sustain themselves in stacked, single-row formations.

Having thus described the invention, what is claimed as new and desired to be secured by Letters Patent is:

1. In article handling apparatus:
   an article receiver tiltable between loading and unloading positions and including a pair of opposed, spacedapart, inclinable retainers defining confines of the receiver for disposition of a load of articles therebetween;
   mechanism for canting said receiver by inclining said retainers for reducing the effective height of the receiver during tilting thereof between said positions;
   elevated article holding structure; and
   a pusher for raising successive tiers of articles to said structure when the receiver is in its loading position and for displacing articles as a stack from the receiver when the receiver is in its unloading position.

2. In article handling apparatus as claimed in claim 1, wherein said mechanism is operable to incline said retainers in unison and in substantially parallel relationship with one another.

3. In article handling apparatus as claimed in claim 1, wherein said retainers are mounted for inclination toward and away from one another for clamping the articles of the load therebetween.

4. In article handling apparatus as claimed in claim 1, wherein each of said retainers is mounted for inclination independently of the other.

5. In article handling apparatus as claimed in claim 1, wherein at least one of said retainers is provided with a retractable tine for impaling a proximal article, and wherein is provided means for operating said tine in response to inclining of its retainer.

6. In article handling apparatus as claimed in claim 1, wherein said receiver is provided with article holding structure extending between said retainers and being movable relative to the latter to accommodate shifting of the articles during tilting and canting of the receiver.

7. In article handling apparatus as claimed in claim 6, wherein said structure is provided with means yieldably biasing the same against such movement.

8. In article stacking apparatus:
   an article receiver tiltable between loading and unloading positions;
   structure in said receiver for supporting in tiered relationship articles successively presented to the structure;
   a stack building and delivering pusher for raising articles to said structure when the receiver is in its loading position and for displacing articles as a stack from the receiver when the latter is tilted to its unloading position; and
   means dividing said receiver into a pair of adjacent sections for the reception of a row of articles in each section on opposite sides of the dividing means,
   said structure including, for each of said sections an inner set of article-impaling spikes associated with said dividing means and an outer set of spikes in spaced opposition to said inner set, said spikes of each inner and outer set being swingably mounted in a manner to allow movement of an article in one direction only from the control of a cooperating pair of opposed spikes.

9. In article stacking apparatus as claimed in claim 8, wherein the spikes of each outer set are provided with means yieldably biasing the same and hence proximal articles toward spikes of the opposed inner set.

10. In article stacking apparatus:
an article receiver tiltable between loading and unloading positions;
structure in said receiver for supporting in tiered relationship articles successively presented to the structure;
a stack building and delivering pusher for raising articles to said structure when the receiver is in its loading position and for displacing articles as a stack from the receiver when the latter is tilted to its unloading position,
said receiver including a pair of opposed spaced apart, inclinable retainers for a load of articles contained by the receiver; and
mechanism for canting said receiver by inclining said retainers.

11. In article stacking apparatus:
an article receiver having a load-carrying bed and a pair of opposed, spaced apart uprights at opposite ends of said bed for confining articles placed in the receiver;
holding structure above said bed for supporting tiers of articles successively raised to the structure;
means mounting said receiver for rotation between a normally upright loading position and a horizontal unloading position; and
power means coupled with the bed for reciprocating the latter relative to said uprights for raising a tier of articles to said structure when the receiver is in its loading position and for pushing the articles as a stack from the receiver when the latter is rotated to its unloading position.

12. In article stacking apparatus as claimed in claim 11, wherein said receiver further includes a pair of opposed sides and a central divider all extending between said uprights to divide the receiver into a pair of adjacent sections, said holding structure including cooperating means on said sides and said divider for supporting a horizontal row of articles in each section.

13. In article stacking apparatus as claimed in claim 12, wherein said bed is divided into a pair of side-by-side assemblies, one for each of said sections.

* * * * *